United States Patent [19]

Gemmani

[11] Patent Number: 5,127,454
[45] Date of Patent: Jul. 7, 1992

[54] MOLDING MACHINES FOR WOODWORKING

[75] Inventor: Giuseppe Gemmani, Rimini, Italy
[73] Assignee: SCM S.p.A., Rimini, Italy
[21] Appl. No.: 652,113
[22] Filed: Feb. 6, 1991

[30] Foreign Application Priority Data

May 24, 1990 [IT] Italy ................................ 3518 A/90

[51] Int. Cl.⁵ ............................................. B27C 1/00
[52] U.S. Cl. .............................. 144/117 R; 144/3 R; 144/134 R; 144/116; 144/252 R; 144/249 R
[58] Field of Search ................... 144/2 R, 3 R, 114 R, 144/116, 117 R, 134 R, 252 R, 249 R, 249 A

[56] References Cited

U.S. PATENT DOCUMENTS

| | | | |
|---|---|---|---|
| 701,104 | 5/1902 | Thomas | 144/116 |
| 2,102,186 | 12/1937 | Nicholson et al. | 144/116 |
| 3,082,802 | 3/1963 | Dickson et al. | 144/252 R |
| 3,367,377 | 2/1968 | Mitten | 144/252 R |
| 4,196,760 | 4/1980 | McDaniel et al. | 144/3 R |
| 4,993,464 | 2/1991 | Englert | 144/3 R |
| 5,007,469 | 4/1991 | Englert et al. | 144/252 R |

*Primary Examiner*—W. Donald Bray
*Attorney, Agent, or Firm*—Darby & Darby

[57] ABSTRACT

In a through feed molder, each tool is mounted to a slide and provided with a dust hood that also carries two conventional hold-down guides, rigidly attached, one on each side of the hood. A mechanism operating between the hood and the slide permits matching of the clearance between the hood and the horizontal bed of the molder to a given tool reference diameter. The hood is also interconnected with the bed by a measuring device which verifies the clearance of the entire tool assembly according to the thickness of the work. Displays are used to indicate the tool reference diameter and the distance of the hood from the bed.

3 Claims, 3 Drawing Sheets

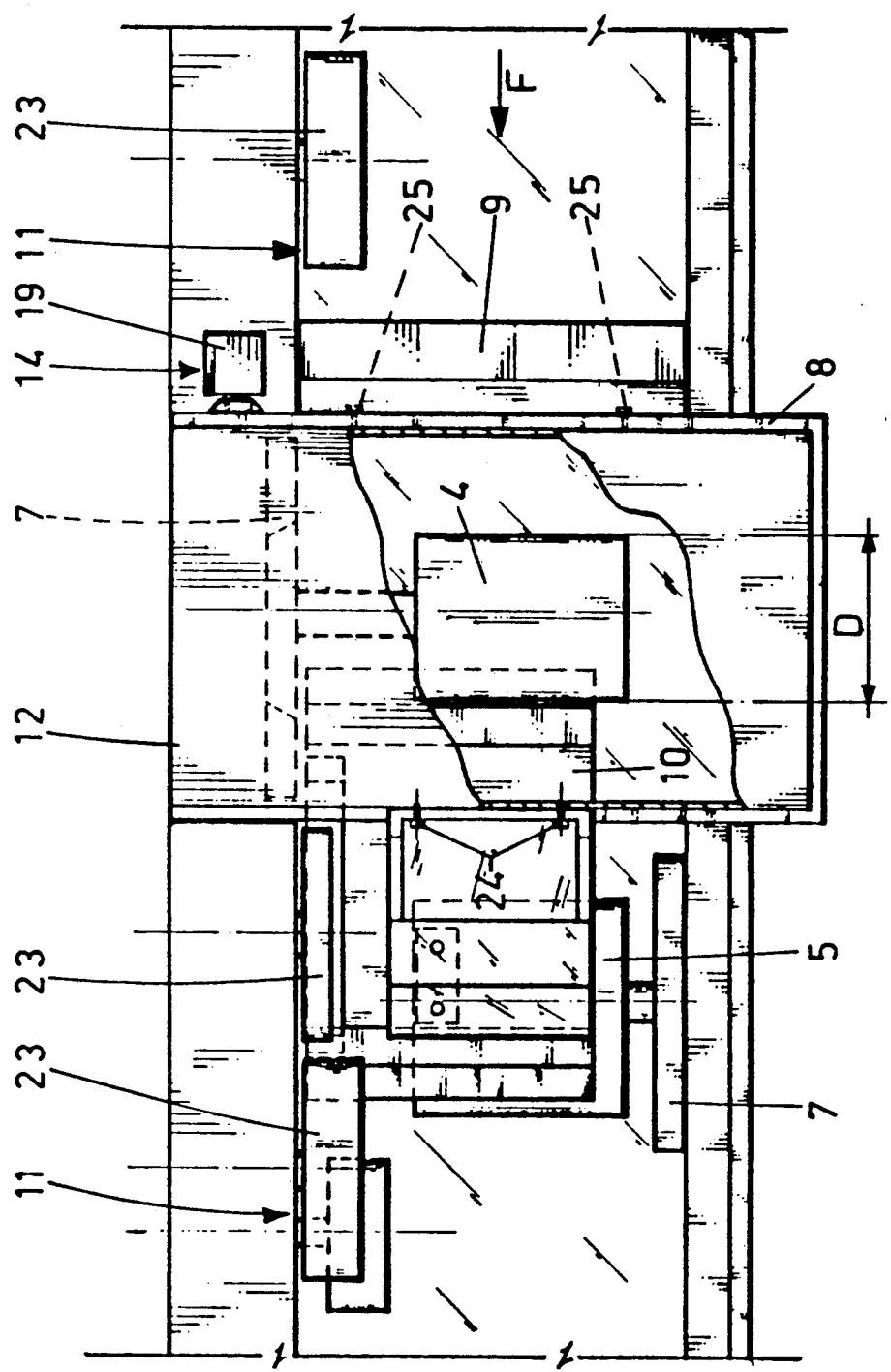

MOLDING MACHINES FOR WOODWORKING

BACKGROUND OF THE INVENTION

The present invention relates to an improvement in molding machines for woodworking.

Manufacturers of woodworking machines, and through-feed molders in particular, continuously research the possibilities of enhancing the quality of the machining produced by such equipment and the possibilities of reducing down time to the minimum obtainable.

In the case of through feed molders, which are designed to machine one or more of the four faces of a quadrangular-section stock supplied from a feed line, it has been found that the operations of changing to different tools (or size of stock) can be notably lengthy and laborious.

The tools which are utilized number at least one for each face or side of the work but can be more, depending on the type of machining to be executed. The tools are arranged in line along a horizontal bed.

The work is fed by wheels (rubber faces, or steel) positioned between the tools and rotating about shafts parallel with the bed. The tools are supported by and driven together from a back rail in such a way that work pieces are directed continuously along the feed path and into engagement with the tools.

SUMMARY OF THE INVENTION

Four tool heads, each relating to a particular face of the work (taken along the feed direction, right side, left side, top and bottom respectively) are positioned internally of protective and dust extraction casings or hoods. The hoods are provided with two elements, disposed one on each side and located externally of the casing, by which the work is held down going into, through and beyond the cutting stroke. More exactly, the first hold-down element encountered by the work piece is angled in order to direct the work onto the tool, whereas the second is positioned parallel to the bed and distanced therefrom at a height that will depend on the prescribed thickness of the machined work.

To reiterate, the operation of replacing any one of the tools is lengthy and laborious. In effect, the operator initially must detach the two hold-down elements, separating them from the supporting back rail,, before a single tool can be removed. The replacement tool must then be aligned with the bed (according to the new diameter), using handwheels and graduated scales available on the machine, by means of which the operator can check and adjust the distance (height) of the axis of rotation of the tool from the bed. This accomplished, the two hold-down elements must be repositioned to suit the diameter of the new tool. The plane occupied by the hold-down elements coincides with the cutting edge at the smallest diameter of the tool, and its distance from the bed (equivalent to the thickness of the work).

It will be clear enough from this brief outline that the change procedure for each tool requires a considerable length of time for the operator to accomplish. Additionally, the precision with which the replacement tool and the hold-down elements are repositioned is dependent in most instances on the skill and experience of the operator.

A further drawback affecting through feed molders is caused by the considerable distance between centers of the feed wheel positioned immediately preceding the horizontal tools, and the first wheel encountered thereafter. This distance clearly represents a source of difficulty when the work to be machined has a length less than the distance in question. The workpiece will tend to stand still for lack of driving contact as soon as it is past the first of the two horizontal tools, being unable to reach the next wheel that is located after the second horizontal tool, until jogged forward by a further workpiece.

This is a disadvantage attributable to the conventional architecture of current machines, in which the distance between the centers of the horizontal tools is extremely limited and does not permit interposition even of a single feed wheel, due to the presence of the second hold-down element and to the fact that the hold-down element is connected directly to the back rail.

Accordingly, an object of the present invention is to overcome the drawbacks in question by restructuring a molding machine in such a way that tool change operations can be optimized and rendered still more precise, and thereby the quality of woodworking operations can be further enhanced.

The stated object is realized in an improvement according to the present invention, whereby each of the tools, mounted to a respective positioning slide capable of movement in a direction normal to the work face, is equipped with a hood to which hold-down guides are connected rigidly on each side, and with means operating between the hood and the slide, by which to adjust the distance of the hood from the work face in keeping with a reference diameter assigned to the tool. The hood is also connected rigidly to measurement means, anchored in their turn to a datum coinciding with the work face and serving to measure the intervening distance in keeping with the thickness of the machined work. The hood also carries means by which to display the values of the tool diameter and of the distance separating the hood from the work face.

BRIEF DESCRIPTION OF THE DRAWINGS

The invention will now be described in detail, by way of example, with the aid of the accompanying drawings, in which:

FIG. 3 is a plan view of the tool of FIG. 2 from above, with certain parts omitted to better illustrate other parts.

DESCRIPTION OF THE PREFERRED EMBODIMENTS

With reference to the drawings, the improvement in molding machines for woodworking in accordance with the invention relates to through feed molders of the type comprising a set of spindle heads installed in-line along a horizontal bed 1 and having a plurality of tools 2, 3, 4 and 5 (see FIG. 1) by which the four faces of a workpiece 6 are machined. In relation to the path F followed by the work 6, the four tools are designated right hand vertical, left hand vertical, top horizontal and bottom horizontal respectively, indicating the face of the work 6, which is machined by the corresponding tool.

Figure 1:
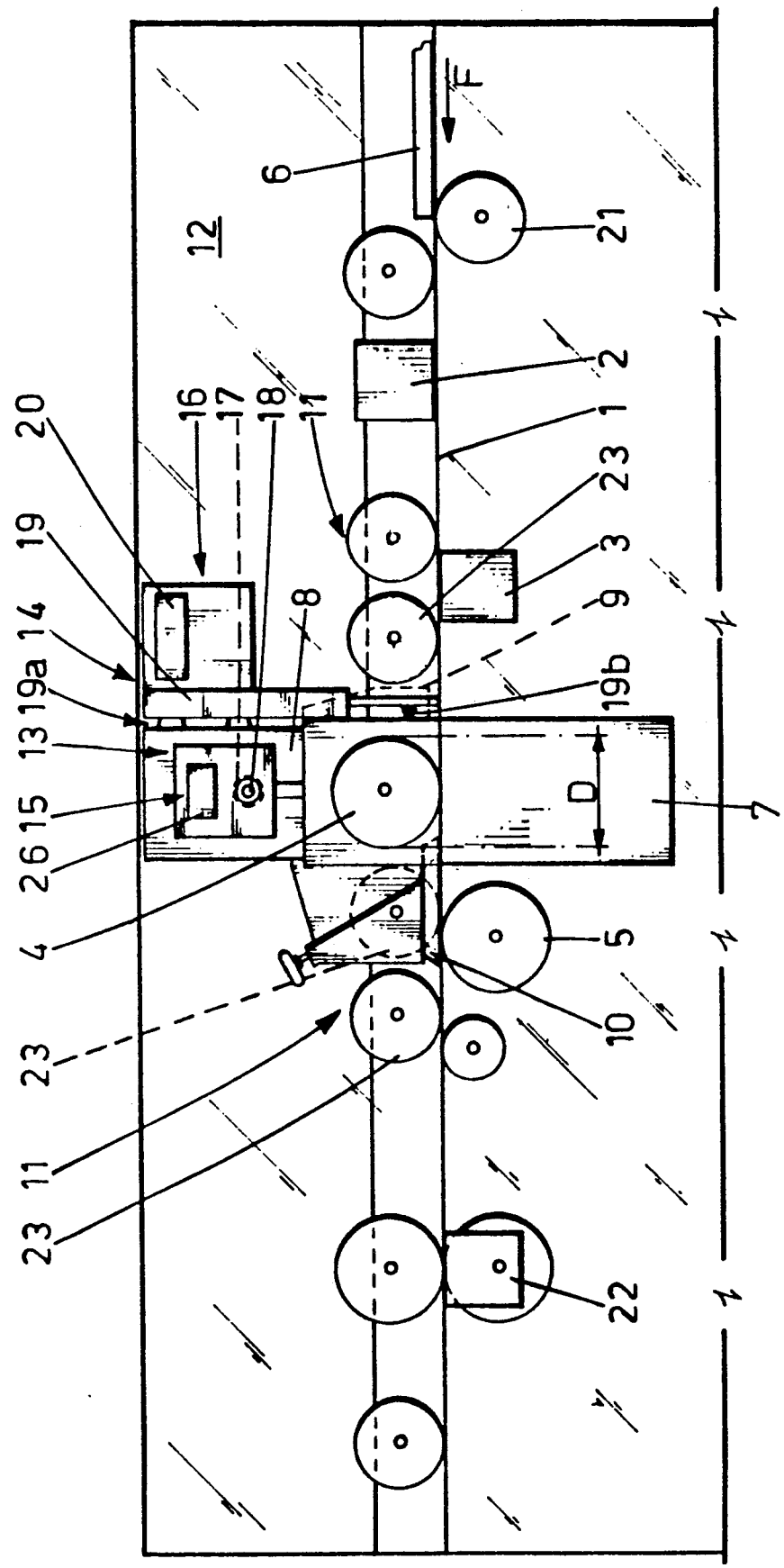
FIG. 1 is a front elevation, showing an arrangement of tools and feed wheels in a through feed molder according to the invention, from which certain parts are omitted to better illustrate other parts.

Also illustrated in FIG. 1 are two additional tools installed respectively at the start and finish of the molding cycle, which tools may contribute to the machining operation according to the format of the work 6. In FIG. 1, these additional tools are a planer 21 located at the entry end, in relation to the feed direction F, and a universal cutter 22 installed at the exit end for shaping angled surfaces.

Each tool 2, 3, 4 and 5 is mounted to a respective slide 7, which has a position in relation to the machine that depends on the type of the associated tool. These slides 7 (one only is illustrated in FIG. 1) vary the operating clearance of the tool in the direction normal to a given datum or work face, which coincides with the horizontal bed, in the tool 4, shown in FIG. 1 by way of example.

Figure 2:
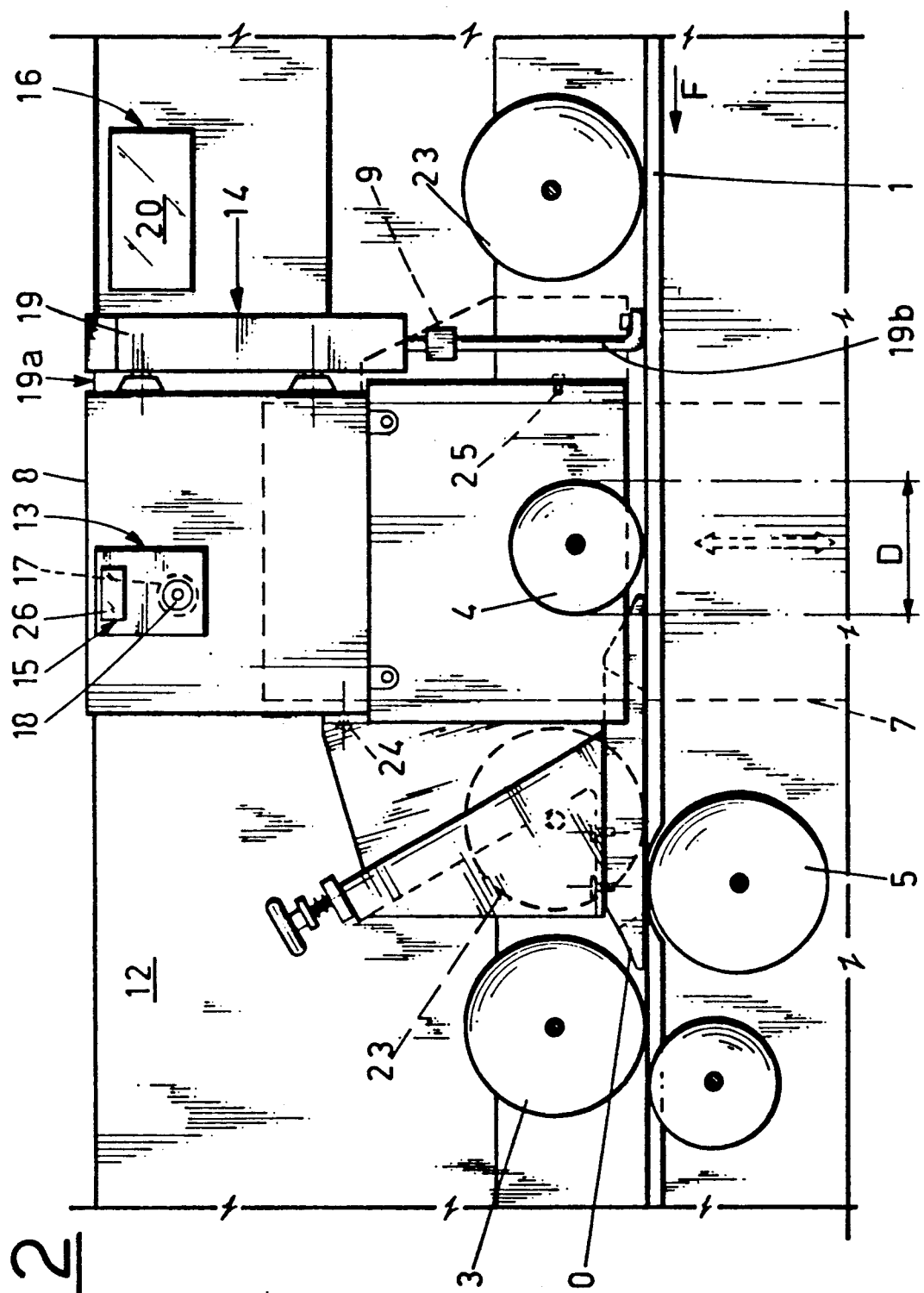
FIG. 2 is a front elevation of one of the cutting tools in the molder of FIG. 1, from which certain parts are omitted to better illustrate other parts.

Also associated with each tool 2, 3, 4 and 5, positioned preceding and following in close proximity to each side of an associated tool hood 8, are two hold-down elements 9 and 10 which include a pair of guides of which the first guide 9 encountered by the work 6 is angled in relation to the bed 1, and the second guide 10 is disposed parallel thereto (FIG. 2), in such a way as to direct and steady the work, respectively, during the cutting stroke.

FIG. 1 also illustrates roller means 11 comprising a plurality of steel or rubber faced wheels 23 positioned at regular intervals along the length of the horizontal bed 1. The wheels 23 are mounted to a back rail 12 which flanks the bed 1 at the rear, as viewed in the drawings. These wheels 23 feed the work 6 from one tool to the next. A disclosed improvement provides each tool 2, 3, 4 and 5 with an associated hood 8 and connects the hold-down guides 9 and 10 rigidly with the hood 8 on both sides of the hood 8 by means of respective screw fasteners 24 and 25. Whereas the improvement is illustrated only in conjunction with the top horizontal tool 4 in the example of the drawings, inclusion of this improvement on any or all of the remaining tools falls clearly within the scope of the invention.

The hood 8 further is equipped with adjustment means 13, operating between the hood itself and the slide 7, by which the position of the hood 8 can be varied in relation to the horizontal bed 1 commensurately with a reference diameter D assigned to the tool. This diameter is determined at each tool change using the nominal diameter of the tool (preferably the minimum cutting diameter, where the profile is mixed). The hood is a protective and dust removing device.

In greater detail, the adjustment means 13 operating between the hood 8 and the slide 7 includes a lead screw mechanism 17 of conventional embodiment (illustrated schematically in phantom line), and a handwheel 18, mounted to the exterior of the hood 8, for giving simple and sure operation. Such a mechanism is connected in turn to respective indication means 15, which in a simple embodiment is a graduated scale, possibly in conjunction with a display 26 showing the value of the tool reference diameter D.

The hood 8 is associated further with measurement means 14, connected in their turn to the datum 1 for verifying the clearance afforded by the hood 8 with respect to the thickness of the work 6. In the illustrated example, measurement means 14 is a linear potentiometer 19 of which one end 19a is attached to the side of the hood 8, adjacent to the first hold-down guide 9, and the other end 19b, or drawbar, is anchored to the bed 1 and slidable internally of the body of the potentiometer 19.

The potentiometer 19 (which effects an absolute measurement) is connected to visual indication means 16 having a display 20 wired to and responsive to the potentiometer circuit.

With a structure of this type, the machine operator need do no more, when the need arises to remove one of the tools (whether in changing to another type of molding or replacing a damaged or worn cutter), than open the protective hood 8, remove the tool in question and fit its replacement. Then the hood 8 is repositioned in such a way as to bring the plane of contact of the hold-down guides into alignment with the lesser diameter of the tool, i.e., such that the value appearing in the display 26 corresponds to the reference diameter D. This done, the distance separating the hold-down elements 9, 10 from the bed 1 will undoubtedly differ from that which existed previously (due to the different diameter D of the replacement tool); the current value, effectively reflecting a new thickness, is indicated directly by the potentiometer display 20.

At this juncture, maneuvering the slide 7 by way of the respective adjustment means 17, 18, and referring directly to the display 20, the operator can reposition the entire hood/hold-down assembly at the requisite clearance.

This construction thus enables greater efficiency in replacing and positioning molding cutters, and in repositioning the associated hold-down elements. Thereby, those procedures, are less time consuming, which procedures with conventional molding toolage tend to be lengthy and laborious. In addition, the displays give a notably precise indication of the tool diameter, and more particularly, of the thickness of the work.

What is claimed:

1. A through feed molding machine for woodworking a work piece, comprising:
    a horizontal feed bed for supporting a work piece and for transporting said work piece along a feed path during machining;
    a plurality of tools positioned in close proximity to said feed bed for machining four work faces of said work piece, each said tool having a cutting edge;
    a plurality of tool slides, each said tool being supported by a respective slide, the position of each said slide and thereby the position of a cutting edge of the associated tool, being adjustable in a direction normal to the work face being machined;
    a plurality of protective and dust collecting hoods, one said hood being connected to each said slide, respectively;
    a plurality of hold-down guides, said guides being rigidly attached in pairs to each said hood in positions preceding and following the associated tool along said feed path, said guides directing and steadying the work piece through a cutting stroke of said associated tool;
    roller means spaced along the length of said feed bed, said roller means being mounted to a rail extending parallel to said bed, said roller means feeding said work piece from one tool to the next along said feed path;
    adjustment means operative between said hood and said tool slide for moving said hood relative to said slide and adjusting the clearance between said hood and the work face of a work piece when a work piece is machined, said movement being commensurate with a nominal diameter assigned to said tool;

instrument means connected between said hood and a fixed datum on said machine for measuring the clearance between said hood and said work face of said work piece to be machined in the direction normal to said work face;

and display means for visual indication of said nominal diameter of said tool and a measured value of clearance between said hood and said work face.

2. A molding machine as in claim 1, wherein said adjustment means operating between said hood and said slide includes a lead screw mechanism rotatable by a hand wheel mounted to an external surface of said hood, said adjustment means being linked to said display means and visual indication means including a graduated scale.

3. A molding machine as in claim 1, wherein said instrument means includes a linear potentiometer connected at one end to the side of said hood adjacent to one side hold-down guide associated with said hood and at the other end of said potentiometer to a datum correlated with the associated work face when a work piece is machined, said potentiometer being connected to said visual indication means including a display wired to and electrically responsive to said potentiometer.

* * * * *